United States Patent
Parzysz et al.

(10) Patent No.: US 12,284,692 B2
(45) Date of Patent: Apr. 22, 2025

(54) METHOD FOR MANAGING AN UNINTERRUPTED CONNECTION OF A MOVING DEVICE

(71) Applicant: Orange, Issy-les-Moulineaux (FR)

(72) Inventors: Fanny Parzysz, Chatillon (FR); Gaël Fromentoux, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 401 days.

(21) Appl. No.: 17/779,321

(22) PCT Filed: Nov. 20, 2020

(86) PCT No.: PCT/FR2020/052143
§ 371 (c)(1),
(2) Date: May 24, 2022

(87) PCT Pub. No.: WO2021/105596
PCT Pub. Date: Jun. 3, 2021

(65) Prior Publication Data
US 2022/0408500 A1    Dec. 22, 2022

(30) Foreign Application Priority Data
Nov. 25, 2019  (FR) ..................... 1913165

(51) Int. Cl.
*H04W 4/00* (2018.01)
*H04W 4/50* (2018.01)
(Continued)

(52) U.S. Cl.
CPC ............. *H04W 76/10* (2018.02); *H04W 4/50* (2018.02); *H04W 28/26* (2013.01)

(58) Field of Classification Search
CPC ....... H04W 76/10; H04W 4/50; H04W 28/26; H04W 72/087; H04W 72/0413
(Continued)

(56) References Cited

U.S. PATENT DOCUMENTS

| | | | |
|---|---|---|---|
| 11,556,123 B2 * | 1/2023 | Wang | .................. G05D 1/0022 |
| 11,727,813 B2 * | 8/2023 | Priest | .................... G08G 5/045 700/251 |

(Continued)

FOREIGN PATENT DOCUMENTS

WO    2019139511 A1    7/2019

OTHER PUBLICATIONS

International Search Report dated Feb. 11, 2021 for corresponding International Application No. PCT/FR2020/052143, Nov. 20, 2020.
(Continued)

*Primary Examiner* — Marceau Milord
(74) *Attorney, Agent, or Firm* — David D. Brush; Westman, Champlin & Koehler, P.A.

(57) ABSTRACT

A method for managing an uninterrupted connection of a moving device to at least one attachment entity of at least one operator of a communication network. The method is implemented by a mediation entity capable of communicating with the at least one attachment entity. The method includes receiving a connection request comprising an identifier of the device and information relating to the movement of the device; determining at least one offer of connection to the at least one attachment entity on the basis of a communication feature, with the transmission of a proposal including the at least one determined connection offer. Determining, by the mediation entity, the connection of the device before its movement enables the movement of the device to be correlated with its connection and enables information relating to the operator or else to the mediation entity not to be disclosed.

14 Claims, 5 Drawing Sheets

(51) Int. Cl.
*H04W 28/26* (2009.01)
*H04W 76/10* (2018.01)

(58) Field of Classification Search
USPC .......................................... 370/329
See application file for complete search history.

(56) References Cited

U.S. PATENT DOCUMENTS

| | | |
|---|---|---|
| 11,830,369 B2* | 11/2023 | Lindqvist ............ G05D 1/0808 |
| 2016/0300492 A1* | 10/2016 | Pasko .................. G08G 5/0043 |
| 2017/0337218 A1* | 11/2017 | Pasko .................. G08G 5/0039 |
| 2019/0289613 A1* | 9/2019 | Fanelli ................... H04W 4/40 |
| 2020/0275455 A1* | 8/2020 | Fanelli ................. H04W 28/26 |
| 2020/0372811 A1* | 11/2020 | Lindqvist ............. H04W 36/16 |
| 2021/0217319 A1* | 7/2021 | Gao ....................... G05D 1/102 |
| 2022/0045747 A1* | 2/2022 | De Rosa ............. G08G 5/0039 |

OTHER PUBLICATIONS

Written Opinion of the International Searching Authority dated Feb. 11, 2021 for corresponding International Application No. PCT/FR2020/052143, filed Nov. 20, 2020.

English translation of the Written Opinion of the International Searching Authority dated Feb. 24, 2021 for corresponding International Application No. PCT/FR2020/052143, filed Nov. 20, 2020.

* cited by examiner

METHOD FOR MANAGING AN UNINTERRUPTED CONNECTION OF A MOVING DEVICE

CROSS-REFERENCE TO RELATED APPLICATIONS

This Application is a Section 371 National Stage Application of International Application No. PCT/FR2020/052143, filed Nov. 20, 2020, which is incorporated by reference in its entirety and published as WO 2021/105596 A1 on Jun. 3, 2021, not in English.

1. TECHNICAL FIELD

The invention relates to the connection of a moving device, such as a drone, to a communication network, this connection potentially being able to be ensured by successively attaching the device to access networks possibly administered by separate operators.

2. PRIOR ART

Professional uses of drones have increased in recent years, and new innovative services have emerged: inspecting works of art, modeling buildings, monitoring forest fires and marine spaces, civil security, home delivery in rural areas or even medical delivery between hospitals. Market opportunities nowadays stem less from the construction of drones and the embedded hardware and more from applications and software dedicated to the real-time collection and analysis of data originating from drones.

Cellular networks offer undeniable advantages. In addition to coverage on a national or even international scale, they operate on a licensed spectrum and may offer an unequalled quality of service. However, there are still many challenges to be met.

A single network operator may find it difficult to offer adequate coverage over a wide territory. Roaming is therefore perceived, by the entities responsible for drone flight plans, to be a fast and effective solution for ensuring a connection throughout the flight. Some of these entities have thus already equipped their drones with a foreign SIM card. These drones therefore pass through certain French airspace situations with a foreign and/or unrecognized connectivity identification, a situation that will most likely have to be limited or banned in the future by air authorities. This option, based on the use of an a priori roaming offering, that is to say by abstracting the specific movements of drones, will therefore not meet the need for connectivity, even more so since the roaming offering does not guarantee connection of the drone at all locations.

In order to ensure continuity of service to their clients, an increasing number of cellular operators are therefore addressing the issue of national roaming and access infrastructure sharing (RAN sharing), and are beginning to position themselves on the marketplace in order to distribute their telecommunication services.

However, these solutions tend more to address the problems of "conventional" and standardized roaming bundles (for example 2 hours of calls and 5 gigabytes for 10 days in Canada) or business subscriptions, for example if a company has offices abroad. These bundles were not designed for uses of drones (even less so flying drones) and cannot be adapted for each flight, that is to say over a limited geographical area (for example an air corridor) and over a limited duration (a few flying hours). Although such bundles could theoretically be contemplated within the framework of existing solutions, they would very quickly be overloaded and unable to be used to be able to manage connectivities offered by a variety of parties, for limited periods and for specific locations.

Legislation on the occupancy of airspace is still highly restrictive. The regulatory bodies (the EASA, European Aviation Safety Agency on the European level and the DGAC (Direction Générale de l'Aviation Civile [Directorate General for Civil Aviation] for France)) do not authorize drones to fly autonomously or while being remotely controlled from the ground (BVLoS, Beyond Visual Line of Sight) unless guarantees are able to be made regarding the identification, the authentication and the location of the drones along the entire route.

An Airborne RF solution from TEOCO [AirborneRF, Connectivity for autonomous drones, Teoco] proposes to optimize the route of a drone and to choose network operators along an itinerary, using an interface that makes it possible to communicate the signal quality information required to compute the route. However, this solution exhibits three major drawbacks:

The optimization of the route is dictated solely by parameters relating to radio waves (signal processing on the physical layer). This means that this solution tends more to make it possible to refine a route that has already been specified. Furthermore, flight authorization is left to the entity that manages the drone, and after the determination of the connection. According to this solution, the drone is either equipped with a foreign SIM card or the entity responsible for the drone subscribes to a bundle with each operator, provided that all of the operators have decided to open their networks up to drones without any constraints.

This solution furthermore involves the operators sending their network quality data to third parties, but these data may however prove strategic and confidential.

The present invention aims to provide improvements over the prior art.

3. SUMMARY

The invention aims to improve the situation by way of a method for managing an uninterrupted connection of a moving device to at least one attachment entity of at least one operator of a communication network, said method, implemented by a mediation entity able to communicate with the at least one entity, comprising
- receiving a connection request comprising an identifier of said device and information relating to the movement of said device,
- determining at least one connection offering to the at least one attachment entity based on a communication feature,
- transmitting a proposition comprising the at least one determined connection offering.

The management method allows moving devices, such as drones, to be connected at all times to a communication network. This continuous connection is necessary for the service offering supported by the drone to effectively always be satisfied, but also for the moving device to always be able to be accessible for identification reasons but also in order to be able to stop it if necessary. Implementing the method by way of a mediation entity that communicates with a plurality of operators furthermore makes it possible to anonymize the features of the moving device for the operators, but also to not provide the manager of the device with the information relating to the operators. The mediation entity furthermore has the advantage of being able to create a connection offering that does not require the manager of the device to know the operators able to propose connectivity over a section of the movement and to possibly itself call upon a large number of operators. This method differs from a roaming offering according to the prior art by virtue of determining a connectivity offering specific to the movement of the device and not to a generic offering independent of the movement and of the device specific to roaming techniques used by operators in communication networks. The attachment entities are for example cellular network access entities, such as eNodeBs or fifth-generation (5G) network access points, Wi-Fi network access points or else devices used by consumer clients and businesses in local area networks, such as for example home gateways, also called Boxes. The method furthermore makes it possible to possibly determine multiple connectivity options or connectivity offerings based on the movement of the device, allowing the manager of the device to be able to select a connection offering prior to the movement and thus to be able to reserve resources in order to effectively ensure the connection of the device while it is moving.

The mediation entity may advantageously use information relating to connectivity offerings determined for previously received requests in order to determine a connection offering suited to the new received request. The mediation entity may thus keep the features of previously established offerings in a database in order to determine a new offering. The mediation entity may furthermore take into account the previously determined offerings in order in particular to ensure load distribution of the attachment entities and avoid an excessively large number of connections of separate devices to an attachment entity at a given time. The mediation entity is thus advantageously involved in the availability of connections for a set of moving devices for which it is necessary to ensure the availability and the quality of service of the connection.

According to one aspect of the invention, in the management method, the connection request furthermore comprises a connection duration of the device.

The connection request may advantageously comprise a connection duration, thus allowing the various operators called upon by the mediation entity to be able to effectively ascertain whether they have resources that comply with this duration and to be able to reserve them where appropriate, thus improving the management of the resources of the access networks. The information about the connection duration of the device, corresponding to a movement duration, furthermore makes it possible to determine the speed of movement of the device using the information about the movement and to determine the connection offering suited to this speed.

According to another aspect of the invention, the management method furthermore comprises receiving, from the at least one entity, a submission message comprising the communication feature to the at least one attachment entity of an operator, the feature being used to determine the connection offering.

To determine a connection offering, the mediation entity may consult a database comprising the various connection data to attachment entities of operators, these data being obtained prior to the reception of the connection request. The mediation entity may also transmit the connection request to attachment entities and determine the offering based on messages received from the attachment entities. These messages advantageously comprise features, in particular with regard to duration of availability of the connection, location of the connection, quality of service and/or available bitrate, and/or security, allowing the mediation entity to determine a connection offering suited to the received request.

According to another aspect of the invention, in the management method, the communication feature relates to a technology implemented by the at least one attachment entity.

The received communication feature advantageously relates to a technology. For example, the mediation entity may determine a connection offering based more on cellular technologies (3G, 4G, 5G) if the connection request is demanding in terms of maintaining connectivity and securing data or based more on Wi-Fi technologies in order to obtain higher bitrates.

According to another aspect of the invention, the management method furthermore comprises transmitting at least one negotiation message comprising an update of the communication feature if the determined connection offering does not correspond to the received request.

If the communication feature does not make it possible to meet the connection request, for example if the communication features do not make it possible to determine a connection offering that is uninterrupted or meets the required movement and/or duration criterion, the mediation entity transmits a negotiation message comprising an updated feature. This sending takes place in particular when the mediation entity composes the connection offering based on the various received messages, and a new communication feature could make it possible to meet the received request. The entity may thus ask an attachment entity to offer a new duration, and/or a change of technology, and/or a new quality of service parameter.

According to another aspect of the invention, in the management method, the submission message furthermore comprises a cost associated with the communication feature.

The attachment entity may advantageously transmit a cost associated with the communication feature so that each connection offering determined by the mediation entity has a corresponding associated cost. This cost associated with each offering may then be used by the manager of the device to select an offering from among those received.

According to another aspect of the invention, the management method furthermore comprises obtaining a message authorizing the connection of said device prior to the determination of the connection offering.

The determination of a connection offering is possibly subject to authorization of the provision of a connection to the device. Before transmitting the proposition, authorization of this connection from an entity for regulating movements of devices, for example drone flights, is possibly necessary. This authorization message may also be received from a device specific to the mediation entity that determines the connection offering.

According to another aspect of the invention, the management method furthermore comprises receiving, from a control entity, the connection request modified with a communication feature required by the control entity. A control or regulation entity may impose certain transmission features on the device. This entity may thus impose sending of location data allowing the control entity to track the movement of the device and/or the control entity may require an additional communication feature of the device.

According to another aspect of the invention, in the management method, the connection request furthermore comprises a quality of service parameter.

Since the aim is to determine an offering suited to the movement, and possibly to the duration of the movement of the device, it is also advantageous for the request to comprise a quality of service parameter, thus allowing the mediation entity to determine an offering suited to the quality of service parameter of the data to be transmitted or to be received based on the determined connection offering. The communication features may thus be examined based on the required quality of service parameter.

According to another aspect of the invention, in the management method, the proposition message furthermore comprises proof that the connection offering corresponds to an uninterrupted connection to at least one communication network.

The movement of the device may be conditional upon the determined connection offering actually being uninterrupted and the moving device always actually being able to be reached while it is moving. Proof, for example a certificate attached to the offering by the mediation entity, may be transmitted such that the device is effectively able to demonstrate that it is reachable. The certificate may advantageously also be used to authorize the attachment of the device to the various attachment entities while it is moving.

According to another aspect of the invention, the management method furthermore comprises receiving a new modified connection request comprising an update of the movement.

When the received connection offering does not correspond to the sent request, because it is not possible to guarantee an uninterrupted connection or because the features of the connection do not meet the demand of the manager of the device, a new connection request comprising a new movement, alternative to the first transmitted movement that was not able to give rise to a satisfactory connection offering.

The various aspects of the management method that have just been described may be implemented independently from one another or in combination with one another.

The invention also relates to a device for managing an uninterrupted connection of a moving device to at least one attachment entity of at least one operator of a communication network, able to communicate with the at least one entity, comprising
  A receiver, able to receive a connection request comprising an identifier of said device and information relating to the movement of said device,
  A computer, able to determine at least one connection offering to the at least one attachment entity based on a communication feature,
  A transmitter, able to transmit a proposition comprising the at least one determined connection offering.

This device, which is able, in all of its embodiments, to implement the management method that has just been described, is intended to be implemented in a mediation entity of a communication infrastructure and may be implemented in a physical equipment or in virtualized form.

The invention also relates to a system for managing an uninterrupted connection of a moving device to at least one attachment entity of at least one operator of a communication network comprising:
  A mediation entity comprising a management device,
  A device that moves in accordance with the information contained in the connection request,
  At least one attachment entity to which the device attaches while it is moving.

The invention also relates to a computer program comprising instructions for implementing the steps of the management method that has just been described when this program is executed by a processor and to a recording medium able to be read by a management device and on which the computer program is recorded.

This program may use any programming language and be in the form of source code, object code or intermediate code between source code and object code, such as in a partially compiled form, or in any other desirable form.

The invention also targets a computer-readable information medium comprising instructions of the computer program as mentioned above. The information medium may be any entity or device capable of storing the programs. For example, the medium may comprise a storage means, such as a ROM, for example a CD-ROM or a microelectronic circuit ROM, or else a magnetic recording means, for example on a hard disk.

Moreover, the information medium may be a transmissible medium such as an electrical or optical signal, which may be routed via an electrical or optical cable, by radio or by other means. The program according to the invention may in particular be downloaded from an Internet network.

As an alternative, the information medium may be an integrated circuit in which the program is incorporated, the circuit being designed to execute or to be used in the execution of the method in question.

4. BRIEF DESCRIPTION OF THE DRAWINGS

Other features and advantages of the invention will become more clearly apparent upon reading the following description of particular embodiments, given by way of simple illustrative and nonlimiting examples, and the appended drawings, in which.

5. DESCRIPTION OF THE EMBODIMENTS

Figure 1:
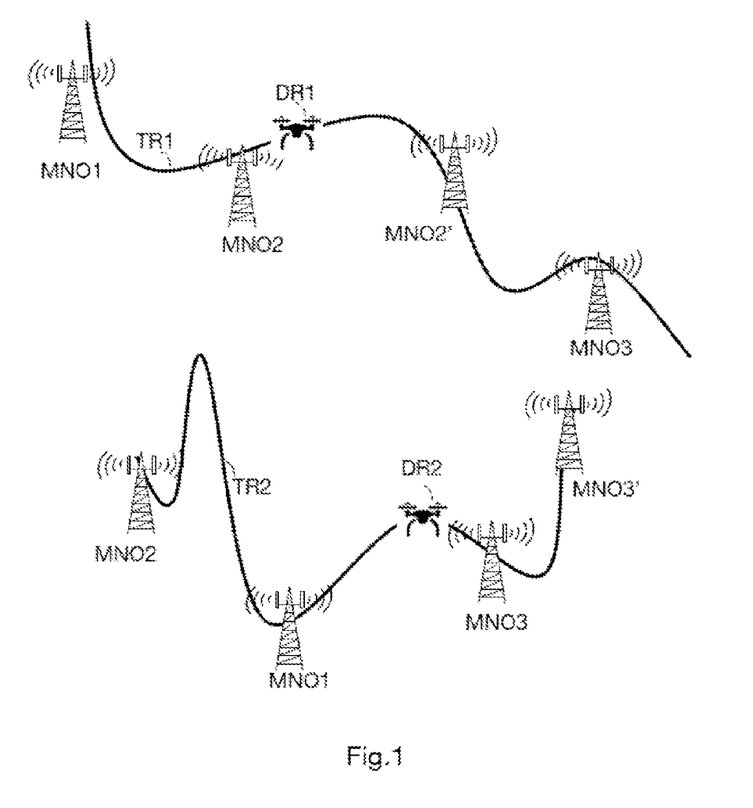
FIG. 1 shows one example of a situation in which the invention is implemented.

FIG. 1 shows one example of a situation in which the invention is implemented. In this [FIG. 1], a moving device, represented by a drone DR1, follows a movement TR1. This may be any device moving on a route and requiring an uninterrupted connection in order to be able to use a communication service, in order to be able to be reached and/or in order to be able to fulfil a legal obligation for tracking the device. According to the prior-art techniques, such a moving device attaches to successive networks as it moves, risking not being connected at a given time due to a lack of resources, for example.

According to the invention, the movement is predefined and the device DR1 knows a priori, that is to say before it executes the movement, the networks to which it will successively connect while it is moving, thus guaranteeing its uninterrupted connectivity. The device DR1 will thus be connected by attaching successively to the attachment entities MNO1, MNO2, MNO2' and MNO3 with regard to the movement TR1. The attachment entities may provide connectivity based on separate technologies (Wi-Fi, 3G, 4G, 5G, etc.) and they may be managed by public or private operators that are separate or not separate for managing these entities. Based on information about the movement TR1, a mediation entity specific to an operator or external to an operator negotiates connection times to attachment entities that are possibly administered by separate operators and guarantees the device DR1 an uninterrupted connection. The negotiation may advantageously pertain to quality of service criteria and a geographical area. The information relating to the movement of the device may correspond to GPS (global positioning system) data or else to indications relating to mapping data specific to the moving device or more generic, such as a location map. In particular when the movement is performed over a long route, it is possible for attachment entities belonging to separate operators to be necessary in order to provide continuous connectivity to the device. The movement may be performed either within a single country or else in multiple countries. The attachment entities may either be cellular network base stations or Wi-Fi access points or any attachment entity that makes it possible to be able to transmit and receive data to or from a communication network. An operator may thus equally be a telecommunications network operator or an internal network operator of a business or a personal network, such as a home network. Thus, in order to provide uninterrupted connectivity to the device DR1, it could be necessary to call upon a 3G, 4G or 5G base station, on CPE (customer premises equipment) or on home gateways, also called Boxes. In this invention, attachment to an entity also means connection to the entity, the device having to have a configuration allowing it to transmit and receive data via the attachment entity to which it is connected. In a comparable manner, the device DR2 moves along a path DR2 and attaches successively to the attachment entities MNO2, MNO1, MNO3 and MNO3', the last two entities being managed by one and the same operator and the first two being managed by two separate operators. Thus, while it is moving, the device DR2 has uninterrupted connectivity to a communications network, giving it the ability to always be reached along the path. This uninterrupted connectivity furthermore allows it to be able to effectively have authorization to move over the path DR2, the uninterrupted connectivity possibly representing an obligation required by an entity for controlling the movements of such devices.

Figure 2:
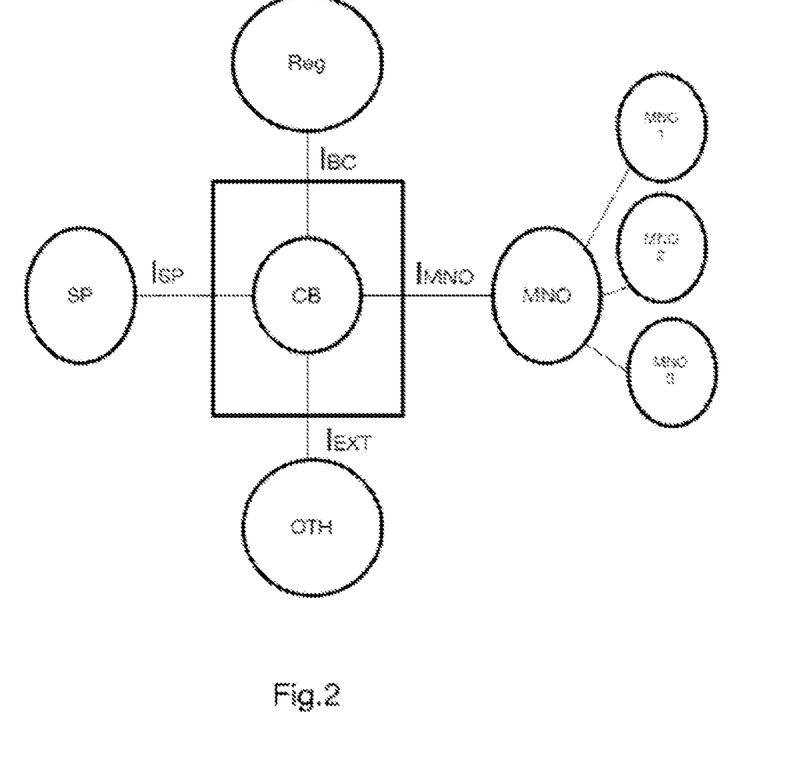
FIG. 2 shows a description of the management method according to a first embodiment.

FIG. 2 shows one embodiment in which the interactions between the parties involved in implementing the management method are described. The center of the figure contains a mediation entity (CB for connectivity broker), which is responsible for determining a connection offering for a moving device, which is considered to be a drone in this embodiment. In order to determine this connection offering, the mediation entity interacts with an entity MNO (mobile network operator), which may be a marketplace in which operators MNO1, MNO2, MNO3 contract connection times, durations and locations. According to one example, the entity MNO may be an operator separate from MNO1, MNO2 and MNO3 or else one of the three operators. According to another example, the entity MNO may be a negotiation entity that is not an operator. The entity CB interacts with the entity MNO via the communication interface $I_{MNO}$. According to another example, the entity CB interacts directly with the three entities MNO1, MNO2 and MNO3 and determines a connection offering based on the negotiations performed with the three operators without interacting with a marketplace. The mediation entity receives a connection request from an entity SP (service provider) with a view to providing an uninterrupted connection to one or more moving devices. The entity SP may be for example a drone operator, a car leasing company or an industrial robot provider or any entity whose purpose is to manage moving devices for which a continuous connection to a communication network is required. The entity SP transmits a connection request for a drone, a machine or a car, as the case may be, by transmitting a connection request via the interface $I_{SP}$ to the mediation entity CB. The entity SP, according to another example, itself receives a request from a service provider. For example, an entity that supervises an electrical network or infrastructure equipments might request supervision of these geographically dispersed equipments for which the operator SP will request a connection to the entity CB via the interface $I_{SP}$.

The entity CB may furthermore interact with other entities in order to implement the management method. The entity CB may thus interact with an entity Reg responsible for recording contracts established between the entity BC and the entity MNO and/or the entities MNO1, MNO2, MNO3. By using the interface $I_{BC}$, the entity CB is able to call upon the record of contracts with the entity Reg, this record being based for example on blockchain technologies or on a distributed ledger technology (DLT) in order to create and validate contracts (smart contracts) or add transactions when a composite connectivity contract is validated. It is particularly important to update the records if the connection is interrupted and it is necessary to find out who was responsible for this interruption. The record may also advantageously be used to remunerate various parties involved in providing connectivity. It should be noted that the management method may be implemented without the interface $I_{BC}$ being activated, for example if the entity CB itself performs monitoring and recording of connectivity offerings established for the entity SP.

The entity CB may furthermore interface with other identified entities OTH (others). According to one example, this may be an authority that authorizes and tracks moving devices. For example, if these are drones, an entity OTH may authorize the drone to fly over the trajectory requested by the entity SP on the condition that a continuous connection offering will have been determined and transmitted to the entity CB. In this example, the entity CB may be operated by a drone management entity (UTM—Unmanned Aircraft System (UAS) Traffic Management). According to another example, the entity OTH may be an assurance entity that needs to be informed of the possibilities that the assured device is reachable at all locations while it is moving. According to yet another example, the entity OTH may be an industrial equipment provider that supervises the moving equipment responsible for monitoring industrial installations. The entity CB communicates with the entity OTH or the entities OTH if multiple entities OTH are involved in implementing the method via the interface LOTH. It should be noted that, according to one alternative, the management method may be implemented without any interaction with an entity OTH.

Figure 3:
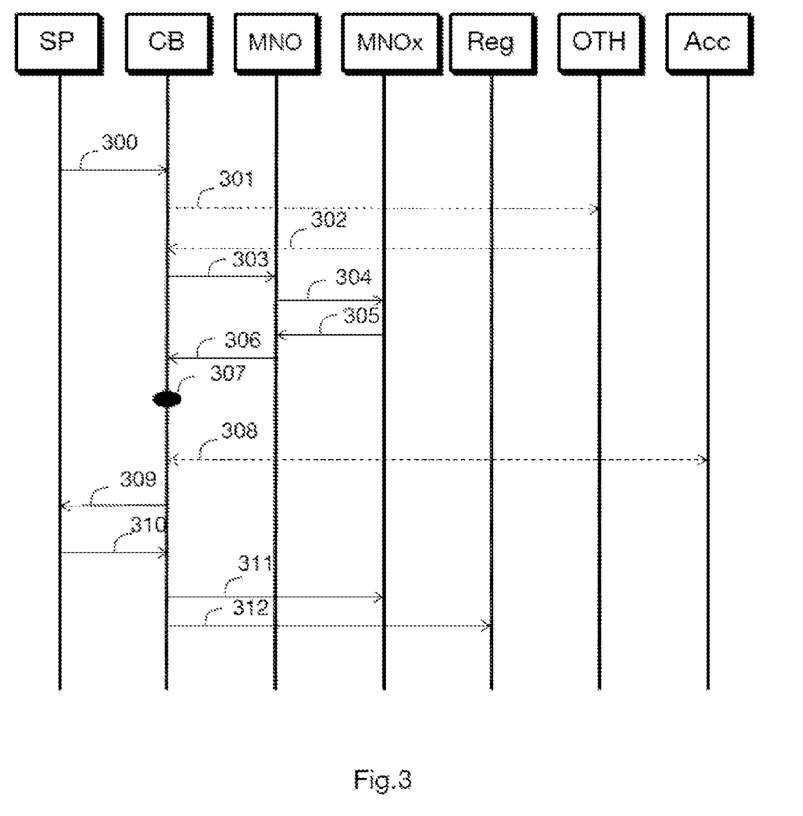
FIG. 3 shows an overview of the steps of the management method according to another embodiment.

FIG. 3 shows an overview of the steps of the management method according to another embodiment.

In a step 300, a service provider SP, represented here by a drone operator, transmits a connection request for a drone, whose identifier is transmitted in the request, to a mediation entity CB. In this request, the provider SP furthermore transmits a route of the drone. For example, the drone is identified by an alphanumeric character string and/or an IP address and/or an FQDN (Fully Qualified Domain Name). According to one alternative, the request furthermore comprises a movement duration corresponding to a required connection duration. By virtue of this information about the connection duration, the mediation entity is able to compute the speed of the drone and determine a connection offering suited to the speed of the drone, in particular by selecting radio technologies that actually allow the drone to attach to the access network quickly enough. According to another example, the connection request comprises a time period that repeats at regular intervals. For example, this may be a movement from a location A to a location B that takes place every day between 3 p.m. and 4 p.m. if the device executes tasks that repeat regularly over a given movement. In the embodiment described in [FIG. 3], the drone Alpha moves between Lannion and Rennes and its movement duration is two hours, the movement taking place between 2 p.m. and 4 p.m. on 5 Nov. 2019. The route may be established based on a set of GPS coordinates, the number of coordinates being suited to the precision of the desired route. The route may also be established based on map coordinates. The provider SP may furthermore transmit one or more items of communication data of the moving drone to the mediation entity CB. According to one example, the entity SP indicates that the drone Alpha requires a high communication bitrate (for example 20 Mb/s) and low latency for a real-time high bitrate video service. These communication data make it possible to determine a connection offering best suited to the movement of the drone, but also to the services implemented by the drone while it is moving.

In an optional step 301, the mediation entity CB calls upon a validation entity OTH, which, in the example, is an entity for authorizing and regulating drone flights. The entity CB requests authorization for the movement of the drone by providing the entity OTH with the information transmitted thereto by the entity SP in step 300. The entity OTH, if it authorizes the movement of the drone, transmits back an authorization for the movement in step 302. In this response, the entity OTH may furthermore indicate additional requirements. Thus, according to one alternative, the entity OTH furthermore indicates to the entity CB that the drone should furthermore have an IoT (Internet of Things) communication channel in order to transmit the position of the drone every minute, specifically so that the entity OTH is able to ensure the movement of the drone corresponding to the transmitted authorization.

In a step 303, the mediation entity calls upon a marketplace MNO, this marketplace having the purpose of communicating with a set of attachment entities of operators MNOx in order to gather individual connectivity offerings. The use of an entity MNO allows the mediation entity CB to dispense with having to know about the technologies and associated constraints. The marketplace MNO may specifically hold regular exchanges with a multitude of attachment entities of operators, ensuring connectivity is provided at a given location and possibly at a given time. The entity CB, in its call message, describes the connectivity need as requested by the entity SP and possibly the entity OTH in steps 300 and 302. In steps 304 and 305, the marketplace in turn calls upon the attachment entities MNOx and receives back the submission messages from the various attachment entities. Only one attachment entity MNOx is shown in [FIG. 3], but the number of attachment entities is not limited. The submission messages comprise a communication feature, such as for example an access technology (Wi-Fi, 3G, 4G, 5G) and/or a maximum data rate or even a quality of service feature. The submission messages furthermore comprise, according to one example, a proposed connection duration along with a cost associated with the communication feature. For example, an attachment entity offering 4G connectivity and 5G connectivity might indicate, in addition to these offered connectivity types, a cost associated with each of these connectivities, allowing the mediation entity CB to determine the connection offering best suited to the service required by the entity SP and to the most appropriate cost.

According to one example, in step 305, the marketplace receives the following connectivity offerings from three attachment entities belonging to two separate operators: an MNO 1 offers 2 connectivity packages for the communication service requested by the provider SP for the drone Alpha: A) between Lannion and Guingamp, from 2:30 p.m. to 3 p.m., and B) from Lamballe to Rennes between 3:15 p.m. and 4 p.m., for a bitrate of 20 Mbps and a maximum latency of 50 ms. An MNO 2 offers a service between Saint-Brieuc and Rennes from 2:30 p.m. to 4 p.m., with a bitrate of 5 Mbps and a latency of 40 ms, and an MNO 3 between Guingamp and Lamballe (package A) or between Lamballe and Rennes (package B), but only from 2:30 p.m. to 3:30 p.m. and without any guarantee of bitrate or latency. It should be noted that the attachment entities may transmit their offerings via a management entity of the respective operators responsible in particular for formatting the connectivity offerings and monitoring them.

Each offering offered by the attachment entities MNO1, MNO2, MNO3 is furthermore associated with a cost.

In step 306, the marketplace transmits the received connectivity offerings to the mediation entity CB. The various communication features along with the costs associated with the respective offerings are also transmitted to the mediation entity CB.

In step 307, the mediation entity determines a connection offering corresponding to the request received in step 300 and created based on the received individual connectivity offerings, and based on the communication features and the costs associated with each individual offering. The mediation entity may determine multiple connection offerings, which might differ based on their cost, their communication features and the attachment entities. The provider SP might thus prefer a lower-cost offering, or else a connectivity offering offering features in addition to those required or complying with external constraints (impossible to fly over certain parts of the territory) may be preferred. According to one example, the mediation entity determines the following connection offering:

Lannion/Guingamp—2:30 p.m. to 2:45 p.m.—MNO 1
Guingamp/Saint-Brieuc—2:45 p.m. to 3:15 p.m.—MNO 3
Saint-Brieuc/Lamballe—3:15 p.m. to 3:30 p.m.—MNO 2
Lamballe/Rennes—3:30 p.m. to 4 p.m.—MNO 1

According to one alternative, the attachment entities MNOx directly transmit submission messages comprising the individual connectivity offerings to the mediation entity CB.

If the submission messages do not make it possible to create a continuous connection offering for the drone Alpha, the mediation entity may again, in steps not shown in [FIG. 3], call upon the marketplace MNO or directly call upon the attachment entities of the operators, possibly while modifying the data specific to the connection request in order to obtain new submission messages and determine a continuous connection offering.

According to one alternative, the mediation entity CB may determine a connection offering without calling upon an MNO or attachment entities. This is possible in particular if the mediation entity CB has stored submission messages transmitted for a previous request and the new received connection request may give rise to determination of a connection offering based on the stored messages, for example for movements that repeat at regular intervals. In a step 308, the mediation entity CB transmits, to an accreditation entity Acc, a message comprising the determined connection offering so that this entity Acc accepts or does not accept the determined connection offering and validates the various attachments of the offering along with the associated communication features. According to one example, the entity Acc and the entity OTH are one and the same entity.

In a step 309, the entity CB transmits a proposition comprising the determined connection offering to the service provider SP, in response to the request message received in step 300. According to one example, the proposition message comprises proof that the connection offering corresponds to an uninterrupted connection to at least one communication network. According to one example, this proof is transmitted by the entity Acc in step 308. According to yet another example, the entity CB indicates, in the proposition, which operators or even which attachment entities are responsible for the vehicle and over which parts of the route. Information relating to the cost associated with the connectivity and with the quality of service is furthermore possibly transmitted, in particular if multiple connection offerings are included in the proposition and the fleet manager has to choose one of them.

If the proposition is accepted by the service provider SP, the latter transmits an agreement message to the mediation entity CB in step 310. If the proposition comprises multiple connection offerings, the agreement message may comprise the selection of one of the offerings offered by the entity CB. This agreement may be subject to contract.

Upon receiving the agreement from the service provider SP, the mediation entity CB, in a step 311, transmits a notification message to the attachment entities whose individual connectivity offerings are used in the connection offering. This notification message advantageously comprises the communication features, the connection duration and information about the section of the route during which a connection is required. According to one example, the mediation entity CB subscribes to the individual connectivity offerings as formulated by the attachment entities, possibly via the marketplace, independently of any overlaps that may exist between the individual connectivity offerings of the entities MNOx (In the previous example, the connectivity offerings of the MNOs 1 and 3 overlap from 2:30 p.m. to 3 p.m.). According to another example, the mediation entity has determined an uninterrupted connectivity offering in step 307, but also one that avoids or limits connectivity overlaps between the individual offerings. In this case, the notification message comprises the connectivity offering modified by the provision of the offering received from the attachment entity in steps 305 and 306.

In a step 312, the mediation entity CB transmits the connection offering that has been determined and accepted by the service provider and possibly agreed upon by the entity Acc to a contract manager Reg in order to store the data relating to the connection offerings, to the associated costs and to the guarantees relating to these contracts.

Figure 4:
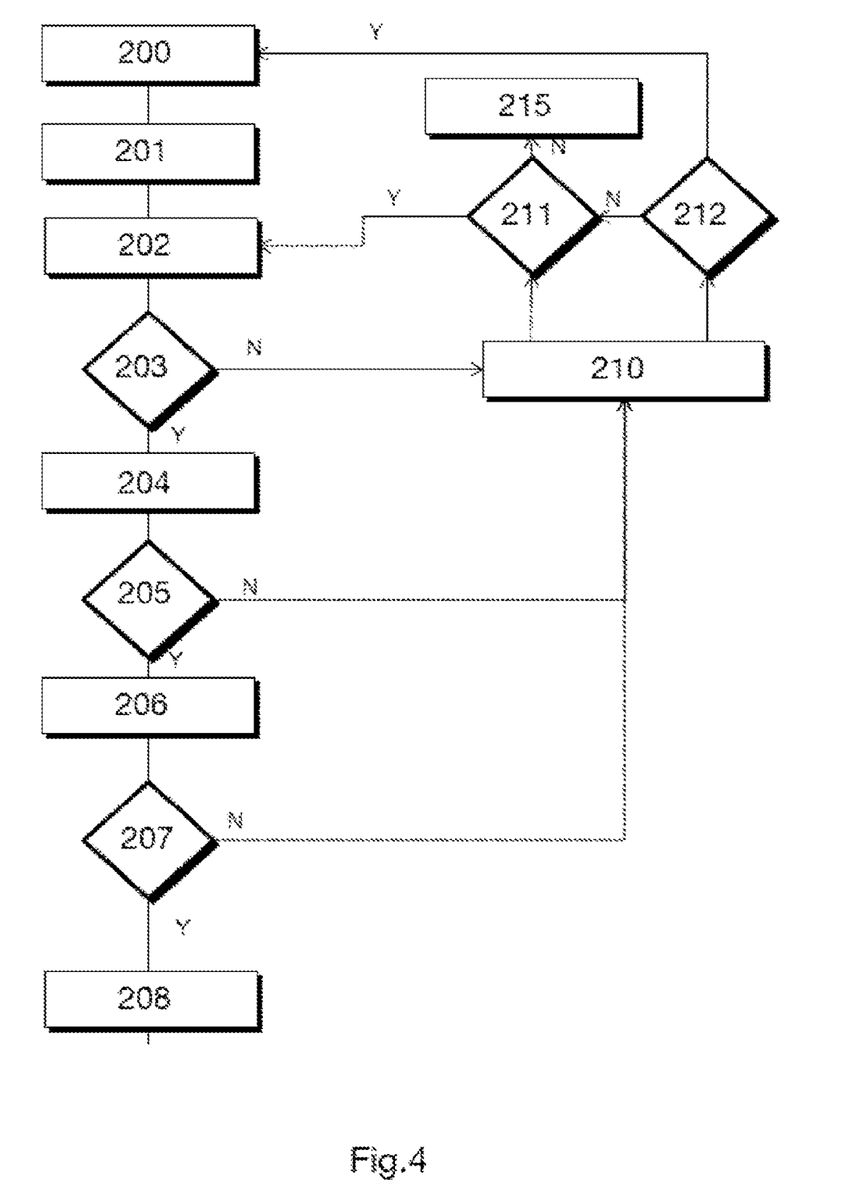
FIG. 4 shows another overview of the steps of the management method according to yet another embodiment.

FIG. 4 shows another overview of the steps of the management method according to yet another embodiment.

In step 200, a vehicle fleet manager transmits, to a mediation entity, a connection request for a truck Gamma transporting sensitive materials and needing to travel on 10 November in accordance with a sequence of GPS data transmitted in the connection request. The required connection does not require a high bitrate, but very high availability so that it is guaranteed that the vehicle is reachable at all points of the route and that it is able itself to transmit information relating to its location every 10 seconds while it is moving.

In step 201, the mediation entity transmits, to attachment entities, the connection request along with the route of the vehicle and the required very high availability, corresponding to a demanding quality of service parameter for the connectivity service to be provided.

In step 202, the mediation entity receives the submission messages from the various attachment entities, these submission messages being able to be transmitted by management entities of operators that administer these entities, along with the offered communication features for guaranteeing the availability of the connection to the attachment entity in question. In this case, these may be availability statistics for such connectivity for a past period and means implemented by the attachment entity to back up a connection that might fail. The mediation entity determines a connection offering based on the various submission messages received from the attachment entities. With regard to the received message, the mediation entity has to establish a connection offering that allows, at each point of the route taken by the vehicle, at least two attachments to two separate entities to be programmed in the connection offering to be determined. The security features specific to the access networks to which the vehicle is likely to attach while it is moving are also taken into account by the mediation entity. A 4G telecommunications operator might thus be preferred to a Wi-Fi hotspot of a business or a town.

In step 203, the mediation entity evaluates whether the determined connection offering actually meets the received connection request by taking into account the received communication features with respect to the requirements present in the received connection request.

If the determined connection offering actually corresponds to the received request, the mediation entity transmits, if necessary, in step 204, the determined connection offering to one or more control entities so that these are able to ensure for example that the determined connection offering is able to meet security rules, conformity rules relating to the movement of the vehicle Gamma and the transported sensitive materials.

If the connection offering does not make it possible to meet the received connection request and the features in terms of quality of service, route and duration thereof in a compliant manner, the mediation entity may, as an alternative or in addition, jointly execute one or two actions following this inability to determine a satisfactory offering. According to a first alternative, in step 210, the mediation entity again calls upon the attachment entities, which are the same or new in comparison with the calling performed in step 201, by indicating the criteria required for this new call, these criteria possibly being different from those indicated previously. In step 211, the mediation entity offers to the attachment entities to modify their offerings, since no offering corresponds to the request received in step 201. Indeed, it has been identified that no offering was able to meet the received request and the mediation entity calls upon attachment entities, in particular those that were initially called upon, to ascertain whether they wish to offer new submission messages. If no new submission message is obtained, then a message declining the connection request is transmitted to the fleet manager in step 215.

According to a second alternative, in step 212, a response message is transmitted to the fleet manager in order to indicate to it that no connection offering is able to be established based on the received submission messages and to ask it whether it wishes to modify its request. The incompatibility between the offering and the request may concern the intended movement and the offered connection, the quality of service offered by the attachment entities, the cost of the connection offering or any other parameter relating to the offering. This message, transmitted in step 212, allows the mediation entity and the fleet manager to negotiate the parameters of the connection offering. For example, the fleet manager might indicate a new route and/or a new schedule (day/time) of the route, which the mediation entity might take into account in order to call upon the attachment entities. A new connection request might be transmitted in step 200 if the initial request is able to be modified. If no new request modifying the initial request is received in step 212, then the mediation entity, in step 211 and possibly 202, examines whether any new submission messages are received for the initially received request and determines, if possible, a new connection offering.

Following the transmission, in step 204, of a connection offering to one or more control entities, these, in step 205, transmit back validation or non-validation of the connection offering. If the connection offering actually makes it possible to satisfy the entity or the control entities, the connection offering is then validated and the mediation entity may then communicate, in step 206, to the fleet manager, the connection offering determined by the mediation entity and validated by one or more control entities. If a control entity does not validate the determined connection offering, then the mediation entity executes the one or more operations specific to step 210.

Following step 206, the fleet manager validates or does not validate the connection offering in step 207. If the connection offering corresponds to the request with regard to the communication features and the cost, then the fleet manager validates the offering and transmits a validation message. If the connection offering is not validated by the fleet manager, the mediation entity executes the one or more operations specific to step 210.

If the connection offering is validated, in step 208, the mediation entity transmits a message to execute the contract to the various entities impacted or involved in the connection offering, specifically the attachment entities, the one or more control entities, the fleet manager and a contract manager, the contract being able to be stored using blockchain techniques.

Figure 5:
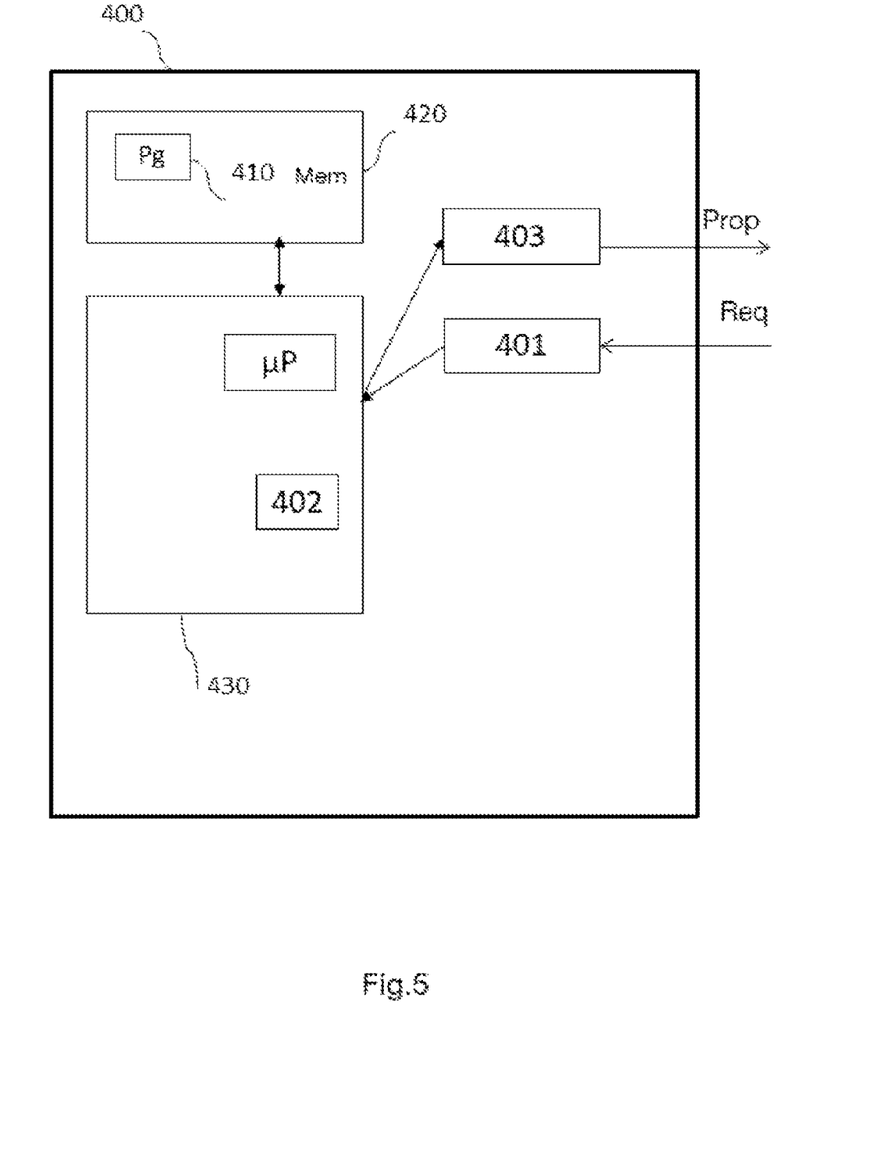
FIG. 5 shows a management device according to one aspect of the invention.

FIG. 5 shows one example of a structure of a management device.

The device 400 for managing a connection implements the method for managing a connection, various embodiments of which have just been described. Such a device 400 may be implemented in a mediation entity as described in the various embodiments of the management method. The device may for example be implemented in a management entity of a telecommunication operator or in a management entity of a business responsible for calling upon the operators to offer connectivity services suited to the services and to the movement features of devices. The device 400 may be instantiated in a fixed or mobile communication architecture and may be instantiated in virtualized form.

For example, the device 400 comprises a processing unit 430, equipped for example with a microprocessor µP, and driven by a computer program 410, stored in a memory 420 and implementing the management method according to the invention. On initialization, the code instructions of the computer program 410 are for example loaded into a memory RAM, before being executed by the processor of the processing unit 430.

Such a device 400 comprises:
- a receiver 401, able to receive a connection request (Req) comprising an identifier of a moving device and information relating to the movement of said device,
- a computer 402, able to determine at least one connection offering to at least one attachment entity of at least one communication network operator based on a communication feature,
- a transmitter 403, able to transmit a proposition (Prop) comprising the at least one determined connection offering.

The method for managing an uninterrupted connection of a moving device has the advantage, for the service provider providing services based on the device, of having a guarantee that the device, and therefore the services using the device, will be able to be implemented without any interruption by virtue of the permanent connection to a communication network.

For example, the use of drones carrying thermal cameras would make it possible to effectively combat illegal night fishing, within an area of 3 miles. However, the areas to be monitored are vast and marine network coverage remains relatively unequal among the various operators. Being able to continuously benefit from roaming in a guaranteed manner would make it possible to provide continuous connectivity and therefore to be able to alert marine authorities at any time to catch criminals in the act. In addition, the photos and videos captured by drones should be able to serve as legal proof, hence the benefit of being able to validate the networks that will be used for the connectivity and therefore that will be able to certify the mission and the data resulting from this mission (notarized networks).

Beyond drones, the architecture of the management method may be extended to other use cases, in particular for any type of connected vehicle (car, truck, bicycle, motorcycle, etc.). Just like drones, these have to benefit from continuous coverage, and certain sensitive data flows should preferably be transmitted over notarized networks. The mediation entity could in this case be linked to the GPS (augmented GPS), which could offer one itinerary rather than another based on connectivity offerings, be this a leisure trip (for example video streaming) or business trip (for example network access for working on a laptop, tracking trucks).

This possibility is all the more necessary since the initial deployments of 5G will not immediately cover the whole of the territory. However, 5G will be the only technology able to provide the bitrates and the QoS necessary for certain applications. Thus, some uses dedicated to 5G verticals will require continuous 5G connectivity, rather than a network that alternates for example between 4G and 5G. The management method therefore furthermore makes it possible to attach a moving device continuously using a specific technology (here 5G) by virtue of determining the connection offering that may prefer a given technology as communication feature.

The management method furthermore has a benefit for operators, who may provide resources to be allocated at a given time over a given geographical area. Since the capacities of the resources are increasingly able to be managed dynamically using virtualization techniques and networks that are configurable on demand, the method may advantageously be coupled with these techniques for configuring networks on demand.

The management method may furthermore be implemented dynamically, typically when the moving device has to change route after it has initiated its movement, so as to be able to guarantee the device and the entities requiring permanent connectivity of the device a continuous connection on the new updated route during the movement.

Although the present disclosure has been described with reference to one or more examples, workers skilled in the art will recognize that changes may be made in form and detail without departing from the scope of the disclosure and/or the appended claims.

The invention claimed is:

1. A management method comprising:
   managing an uninterrupted connection of a moving device to at least one access network entity of at least one operator of a communication network, wherein the managing is implemented by a mediation entity able to communicate with the at least one access network entity and comprises:
   receiving, from a manager of the moving device, a connection request comprising an identifier of said moving device and information relating to movement of said moving device,
   determining at least one connectivity option to the at least one access network entity based on a communication feature,
   transmitting the at least one determined connectivity option to the manager of the moving device, and
   receiving, from the manager of the moving device, an agreement message comprising a selected connectivity option, from the at least one determined connectivity option, the agreement message being used for reservation of access network resources prior to the movement of the moving device for ensuring effectively the connection of the moving device to the at least one access network entity while said moving device is moving.

2. The management method as claimed in claim 1, wherein the connection request furthermore comprises a connection duration of the moving device.

3. The management method as claimed in claim 1, furthermore comprising receiving, from the at least one access network entity, a submission message comprising the communication feature to the at least one access network entity of the at least one operator, the communication feature being used to determine the at least one connectivity option.

4. The management method as claimed in claim 3, wherein the communication feature relates to a technology implemented by the at least one access network entity.

5. The management method as claimed in claim 3, furthermore comprising transmitting at least one negotiation message comprising an update of the communication feature if the determined at least one connectivity option does not correspond to the received request.

6. The management method as claimed in claim 1, wherein the submission message furthermore comprises a cost associated with the communication feature.

7. The management method as claimed in claim 1, furthermore comprising obtaining a message authorizing the connection of said moving device prior to the determination of the at least one connectivity option.

8. The management method as claimed in claim 1, furthermore comprising receiving, from a control entity, the connection request modified with a communication feature required by the control entity.

9. The management method as claimed in claim 1, wherein the connection request furthermore comprises a quality of service parameter.

10. The management method as claimed in claim 1, wherein the proposition message furthermore comprises proof that the at least one connectivity option corresponds to an uninterrupted connection to at least one communication network.

11. The management method as claimed in claim 1, furthermore comprising receiving a new modified connection request comprising an update of the movement.

12. A management device for managing an uninterrupted connection of a moving device to at least one access network entity of at least one operator of a communication network, able to communicate with the at least one access network entity, the management device comprising:
   a transmitter;
   a receiver;
   a computer; and
   a non-transitory computer readable medium comprising instructions stored thereon which when executed by the computer configure the computer to:
   receive using the receiver, from a manager of the moving device, a connection request comprising an identifier of said moving device and information relating to movement of said moving device,
   determine at least one connectivity option to the at least one access network entity based on a communication feature,
   transmit using the transmitter, to the manager of the moving device, a proposition comprising the at least one determined connectivity option, and
   receive using the receiver, from the manager of the moving device, an agreement message comprising a selected connectivity option, from the at least one determined connectivity option, the agreement message being used for reservation of access network resources prior to the movement of the moving device for ensuring effectively the connection of the moving device to the at least one access network entity while said moving device is moving.

13. A system for managing the uninterrupted connection of a moving device to the at least one access network entity of the at least one operator of the communication network, the system comprising:
   the management device as claimed in claim 12,
   the moving device that moves in accordance with the information contained in the connection request, and
   the least one access network entity to which the moving device attaches while moving.

14. A non-transitory computer-readable recording medium on which a program is recorded, the program comprising code instructions, which when executed by a processor of a management device, configure the management device to implement a method of managing an uninterrupted connection of a moving device to at least one access network entity of at least one operator of a communication network, wherein the managing comprises:
   receiving, from a manager of the device, a connection request comprising an identifier of said moving device and information relating to movement of said moving device,
   determining at least one connectivity option to the at least one access network entity based on a communication feature,
   transmitting the at least one determined connectivity option to the manager of the moving device, and
   receiving, from the manager of the moving device, an agreement message comprising a selected connectivity option, from the at least one determined connectivity option, the agreement message being used for reservation of access network resources prior to the movement of the moving device for ensuring effectively the connection of the moving device to the at least one access network entity while said moving device is moving.

* * * * *